United States Patent [19]

Brandon

[11] Patent Number: 5,037,115
[45] Date of Patent: Aug. 6, 1991

[54] PISTON RING ASSEMBLIES FOR HIGH TEMPERATURE SEALS

[76] Inventor: Ronald E. Brandon, 1734 Lenox Rd., Schenectady, N.Y. 12308

[21] Appl. No.: 405,871

[22] Filed: Sep. 11, 1989

[51] Int. Cl.$^5$ .............................................. F16J 15/08
[52] U.S. Cl. ...................................... 277/26; 277/175; 277/235 A; 277/236; 415/134; 415/136
[58] Field of Search ................. 277/26, 154, 173, 174, 277/217, 223, 224, 235 A, 236, 30, 175, 193; 415/111, 112, 113, 134, 135, 136

[56] References Cited

U.S. PATENT DOCUMENTS

| | | | |
|---|---|---|---|
| 1,388,168 | 8/1927 | Bullard | 277/175 |
| 1,801,688 | 4/1931 | Petre | 277/154 |
| 2,863,632 | 12/1958 | Miller | 415/136 |
| 3,539,192 | 11/1970 | Prasse | 277/24 |
| 3,810,640 | 5/1974 | Ahlen | 277/173 X |
| 3,999,894 | 12/1976 | Nakayama et al. | 277/26 X |
| 4,323,257 | 4/1982 | Kondo et al. | 277/224 |
| 4,449,422 | 5/1984 | Fuehrer et al. | 277/26 X |
| 4,515,750 | 5/1985 | Pardini et al. | 277/207 A X |
| 4,612,260 | 9/1986 | Kumagai et al. | 277/235 A X |
| 4,702,671 | 10/1987 | Brinkman et al. | 277/174 X |
| 4,850,794 | 7/1989 | Reynolds, Jr. et al. | 415/136 |
| 4,876,158 | 10/1989 | Onuki et al. | 277/235 A X |

FOREIGN PATENT DOCUMENTS

| | | | |
|---|---|---|---|
| 520754 | 2/1931 | Fed. Rep. of Germany | 277/175 |
| 785993 | 5/1935 | France | 277/175 |
| 93102 | 5/1985 | Japan | 415/113 |
| 241406 | 10/1986 | Japan | 415/113 |
| 485429 | 5/1938 | United Kingdom | 277/175 |
| 708562 | 5/1954 | United Kingdom | 277/235 A |

OTHER PUBLICATIONS

"The Seals Book": p. 31, published 1961.
William F. Smith, "Structure and Properties of Engineering Alloys", 1981, pp. 294 & 305.

Primary Examiner—William A. Cuchlinski, Jr.
Assistant Examiner—Scott W. Cummings
Attorney, Agent, or Firm—Ross, Ross & Flavin

[57] ABSTRACT

In a turbine inclusive of: a turbine shaft having a longitudinal axis, a steam pipe, a shell circumadjacent the pipe, the pipe and shell being shiftable in vertical and transverse and axial directions relative to the longitudinal axis of the shaft, and a seal assembly disposed between the pipe and shell and comprising a stack of interdigitated relatively large and small piston rings, the improvement comprising: each large ring loosely fitting inside the shell during nonoperative conditions and firmly and sealingly engaging the shell during operative conditions; and having a coefficient of thermal expansion greater than that of the shell for expanding at a rate faster than the expansion rate of the shell under a condition of increased temperature, each small ring loosely fitting around the pipe during nonoperative conditions and firmly and sealingly engaging the pipe during operative conditions; and having a coefficient of thermal expansion less than that of the pipe for expanding at a rate slower than the expansion rate of the pipe under a condition of increased temperature, with the large and small rings tightening upon the respective shell and pipe respectively under an increasing temperature condition and shrinking from the respective shell and pipe respectively under a decreasing temperature condition.

8 Claims, 3 Drawing Sheets

PISTON RING ASSEMBLIES FOR HIGH TEMPERATURE SEALS

BACKGROUND OF THE INVENTION

1. FIELD OF THE INVENTION

In steam turbines it is necessary to provide a sealed passage for steam between two separate casings or shells. Since the casings have different rates and magnitudes of thermal expansion, the seals must be capable of accepting vertical, axial, and transverse differential expansion of the shells, relative to the axis of the turbine shaft, without permitting significant leakage.

2. DESCRIPTION OF RELATED ART

A common method of sealing employs a stack of piston rings that surround a pipe or snout that projects from one shell into a second shell. The stack of piston rings alternate in size, with somewhat smaller rings that fit tightly to the snout being held between larger piston rings that are held in the bore of the second shell such that the outer surface of the rings seal tightly to it. This method permits sliding motion of the pipe through the piston rings while maintaining a seal. It also permits transverse and axis motion of the pipe by siding the small piston rings relative to the large piston rings, still maintaining a tight seal between the opposing large and small piston ring surfaces while the inner surface of the small piston rings and the outer surface of the large rings continue to seal tightly with the pipe and shell surfaces, respectively.

This method has been in use for a long period of time. It has several disadvantages:

The friction between rings is high and becomes higher as steam pressures are increased. This increases the stress in the rings when sliding motion is required and can cause permanent stretching of the rings that permits leakage The rings develop layers of oxide coatings in the hot steam environment that decreases the clearance between rings, eventually leading to a condition that locks the rings in a fixed position precluding motion without stretching the smaller rings, leading to leakage. The oxide layers can become torn and may be of varying thickness, also allowing leakage.

Oxide layers that form between the shell and the large ring outer surface locks these rings in position so that removal for cleaning is not practical without damaging the rings, thereby preventing further service.

SUMMARY OF THE INVENTION

In the invention hereof, conventional piston ring assemblies are improved by the use of materials with low friction coefficient and low tendency for oxide layer formation; plus, a surface lubricant is added to further reduce friction; and spring mean are employed to ensure proper surface contact.

The disadvantages described above and others are improved by the instant invention, one of whose object is to reduce the friction forces that damage the small rings and allow steam leakage.

A further object of the invention is to reduce the magnitude of oxide layer thickness that develops on the piston ring and shell surfaces.

Still a further obJect is to reduce the tendency of the rings to lock in position, preventing both motion and the ability to remove, inspect and reinstall the rings for further service.

DESCRIPTION OF THE PREFERRED EMBODIMENTS

Figure 1:
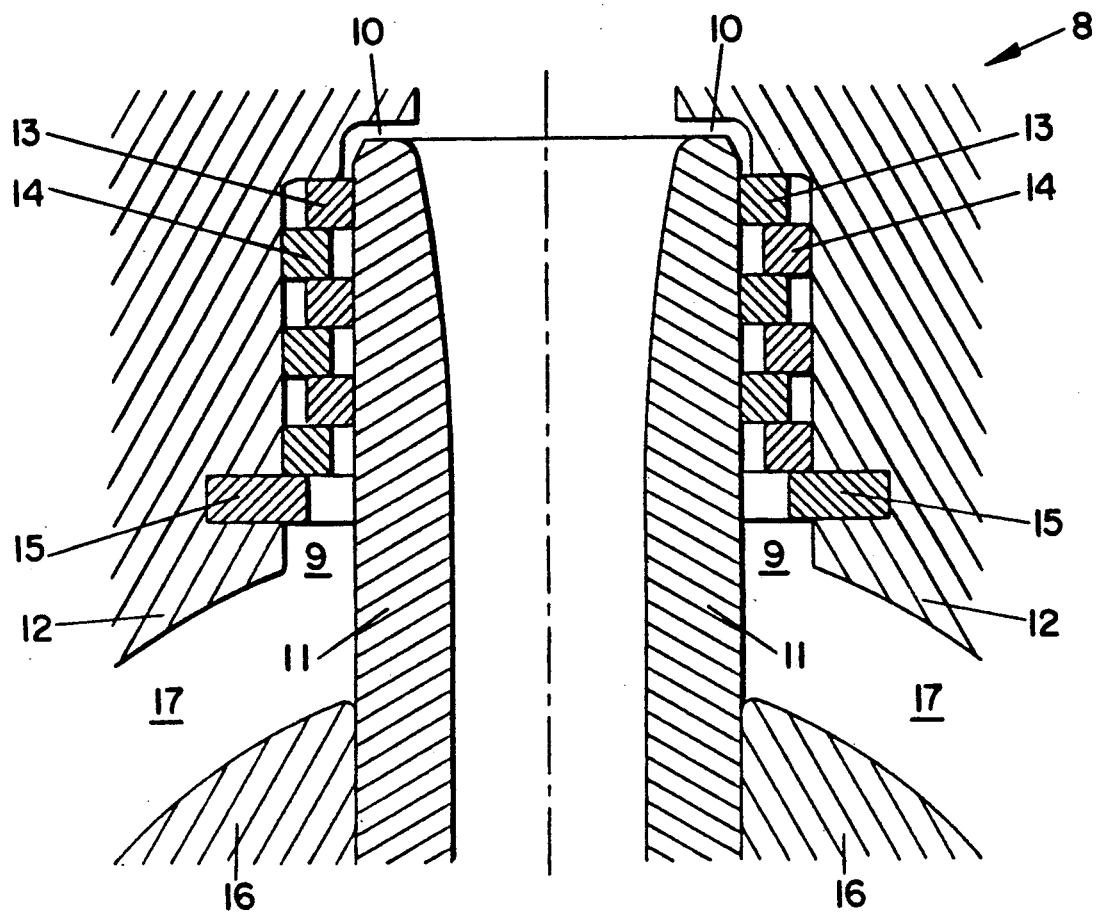
FIG. 1 is a cross-sectional view of a prior art piston ring assembly incorporated in a steam turbine section in the zone where high pressure steam is being passed through an outer shell into an inner shell.

FIG. 1 is a cross-sectional view of a typical prior art piston ring assembly 8 incorporated in the zone of a steam turbine section where high pressure steam is being passed through an outer shell 12 into an inner shell 16. Leakage of steam into a space 17 between the shells will be harmful to efficiency and turbine output. Frequently, there are multiple steam inlets, (not shown), in the same plane.

A snout or pipe section 11 projects from inner shell 16 into a cylindrical opening 10 machined into outer shell 12.

In an annular space 9 between pipe section 11 and cylindrical opening 10 in outer shell 12 is mounted piston ring assembly 8 comprising a plurality of small piston rings 13, which fit tightly on the outer periphery of pipe 11, essentially preventing steam leakage at that interface, and a plurality of large piston rings 14 which fit tightly against the wall of opening 9 in outer shell 12, essentially eliminating leakage at that interface.

The small and large piston rings are stacked one on the other in alternating manner and also have common contact surfaces on their upper and lower faces that prevent leakage between the adjacent piston rings.

The steam pressure inside pipe 11 will be higher than the pressure in space 17 between shells 12 and 16, so a positive pressure compresses the rings together.

The rings are prevented from being blown out by a locking ring 15 provided in outer shell 12 and extending into opening 9. This ring is normally made in segments to facilitate assembly.

The steam pressure on the rings compresses the stack together, helping to minimize leakage, but also increasing friction at times when sliding is necessary. This occurs when inner shell 16 changes temperature relative to outer shell 12. Such changes occur during starting, shutdown and operation.

Inner shell 16 can be expected to change the position of pipe 11 relative to outer shell 12 in all three directions: vertically, axially and transversely relative to the axis of the turbine shaft.

To permit such differential motion in the transverse, vertical and axial directions, small piston rings 13 must slide relative to large piston rings 14. This motion must take place without creating such high stress in the small rings as to cause permanent deformation and leakage. Leakage will occur if the rings become stretched and no longer seal against pipe 11.

The general arrangement described above has been in use for several decades with moderate success. The problems encountered include stretching of the small rings with subsequent leakage. The stretching results from high friction that resists the piston ring sliding, which sliding is essential to successful operation. It is costly to evaluate the condition of the rings and to replace them.

The invention eliminates previous problems by a combination of all or some of the following improvements:

1. piston rings are made of materials whose surfaces form only thin oxide layers in the high temperature steam environment;
2. piston rings are made of materials that have small coefficients of friction;
3. piston rings are made of materials whose thermal coefficient of expansion is somewhat smaller than the pipe material for the small rings and somewhat greater than the expansion coefficient of the shell for the large rings;
4. a high temperature dry film lubricant is applied to the various sliding surfaces to further reduce friction and to further discourage the formation of oxide films on the ring, shell and pipe surfaces; and
5. spring means is added to ensure that the stack of piston rings makes contact with one another at all times.

The rings may be made of ore material but will have inlays, coatings, or surface treatments to help achieve the improvements listed above.

With regard to the differential expansion coefficients identified above, the combination of initial clearance and differential growth must achieve a good seal for moderately low temperatures known to occur at start-up without incurring unsatisfactorily high stress and yielding or creeping at higher operating temperatures.

With regard to materials, 12% chrome is known to have a smaller expansion coefficient than most ferritic materials. Stellite is known to have both a low friction coefficient and to form very thin oxide layers.

Figure 2:
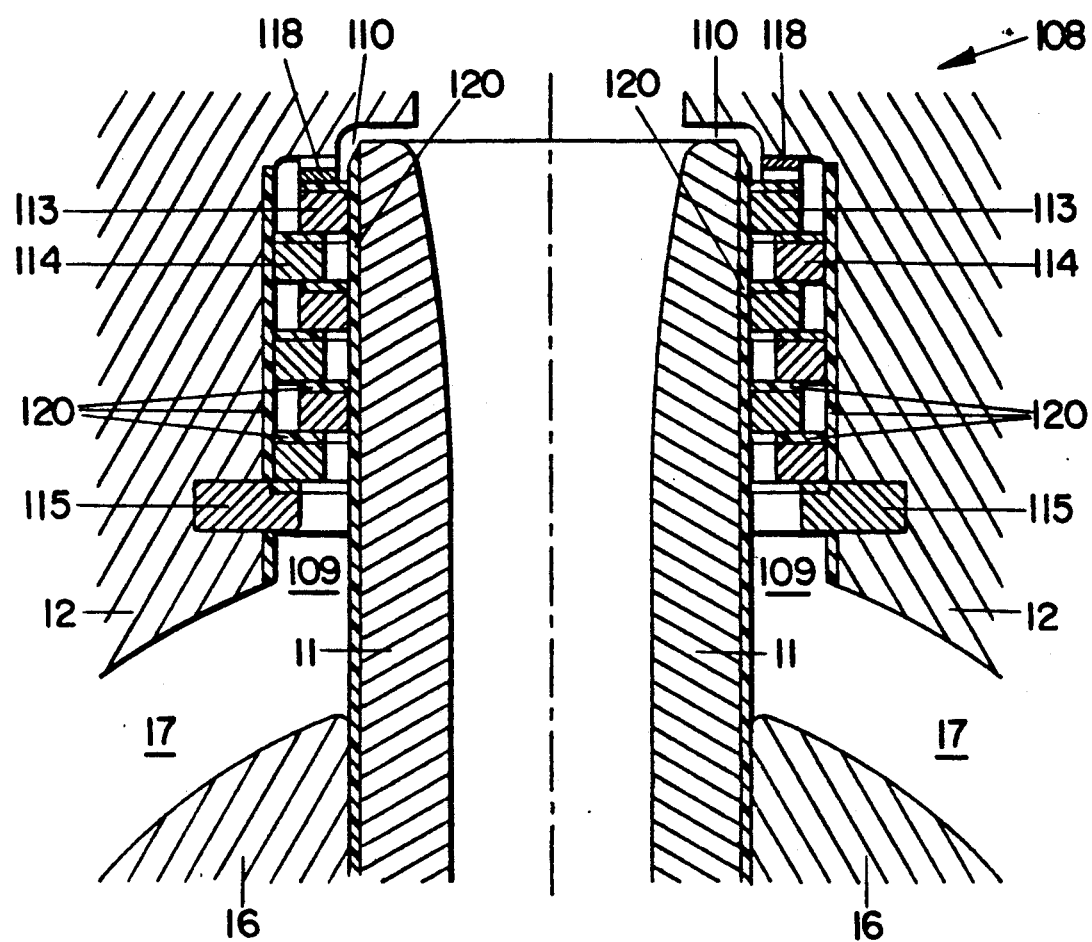
FIG. 2 is a similar cross-sectional view of a piston ring assembly incorporating the improvements of the invention.

FIG. 2 is a cross-sectional view of a piston ring assembly 108 embodying the invention.

As with the prior art piston ring assembly 8 of FIG. 1, piston ring assembly 108 is incorporated in the zone of a steam turbine section where high pressure steam is being passed through an outer shell 12 into an inner shell 16. Leakage of steam into a space 17 between the shells will be harmful to efficiency and turbine output.

A snout or pipe section 11 projects from inner shell 16 into a cylindrical opening 110 machined into outer shell 12.

In an annular space 109 between pipe section 11 and cylindrical opening 110 in outer shell 12 is mounted piston ring assembly 108 comprising a stack of small piston rings 113 alternating with large piston rings 114.

Annular space 109 accommodates at its upper end a flat helical spring 118, with the spring bearing on the uppermost ring in ring assembly 108 and against the upper wall of space 109 to ensure that the stack of piston rings makes contact with one another at all times.

Spring 118 is preferably formed from Inconel-718 because of its exceptionally high yield tensile creep rupture properties at elevated temperature; however, there are other suitable materials available for consideration by those skilled in the art.

Rings 113 and 114 are prevented from being blown out by a locking ring 115 provided in outer shell 12 and extending into opening 109 adjacent the lower end of the opening.

Small piston rings 113 fit tightly on the outer periphery of pipe 11, essentially preventing steam leakage at that interface.

Large piston rings 114 fit tightly against the wall of opening 9 in outer shell 12, essentially eliminating leakage at that interface.

The small and large piston rings also have common contact surfaces on their upper and lower faces that prevent leakage between the adjacent piston rings.

The steam pressure inside pipe 11 will be higher than the pressure in space 17 between shells 12 and 16, so a positive pressure compresses the rings together.

The steam pressure on the rings compresses the stack together, helping to minimize leakage, but also increasing friction at times when sliding is necessary. This occurs when inner shell 16 changes temperature relative to outer shell 12. Such changes occur during starting, shutdown and operation.

Inner shell 16 can be expected to change the position of pipe 11 relative to outer shell 12 in all three directions: vertically, axially and transversely.

To permit such differential motion in the transverse, vertical and axial directions, small piston rings 113 must slide relative to large piston rings 114. This motion must take place without creating such high stress in the small rings as to cause permanent deformation and leakage. Leakage will occur if the rings become stretched and no longer seal against pipe 11.

To eliminate problems encountered with prior art ring assemblies, piston rings 113 and 114 are made of materials whose surfaces form only thin oxide layers in the high temperature steam environment.

In addition, piston rings 113 and 114 are made of materials that have small coefficients of friction.

Additionally, piston rings 113 and 114 are made of materials whose thermal coefficient of expansion is somewhat smaller than the material of pipe 11 for small rings 113 and somewhat greater than the expansion coefficient of shell 12 for the large rings 114.

Materials for the rings shall have the characteristics of being resistant to oxidation minimizing friction. In addition, the smaller rings 113 in contact with the snout 11 shall have a coefficient of thermal expansion less than the low alloy steel of the snout, while the larger rings 114 shall have a coefficient of thermal expansion greater than the low alloy steel shell 12. Thus, the smaller rings 113 would minimize steam leakage along the snout 11 at elevated temperatures, while the larger rings 114 would minimize steam leakage along the outer shell 12.

For the smaller rings 113, employment of any of the martensitic stainless steels for use at elevated temperatures would be applicable.

For the larger rings 114, employment of any of the austenitic stainless steels and precipitation hardening alloys intended for high temperature application would be appliable.

As alternate motherhood material options, low alloy steels intended for elevated temperature application may also be utilized provided the contact surfaces are overlay welded with cobalt-base alloys on the smaller rings and austenitic stainless steel weld overlays on the larger rings.

Thus, the rings 113 and 114 may be made of ore material but will also have inlays, coatings, or surface treatments as indicated to help achieve the improvements listed above.

A coating 120 of a high temperature dry film lubricant is applied to the various sliding surfaces to further reduce friction and to further discourage the formation of oxide films on the ring, shell and pipe surfaces. An example of a suitable lubricant is: MOLYCOTE, a produce of Dow Corning Company applied as a dry film.

As aforesaid, spring 118 ensures that the stack of piston rings 113 and 114 makes contact with one another at all times.

Alternative forms of spring means are shown in FIGS. 3-7.

Figure 3:
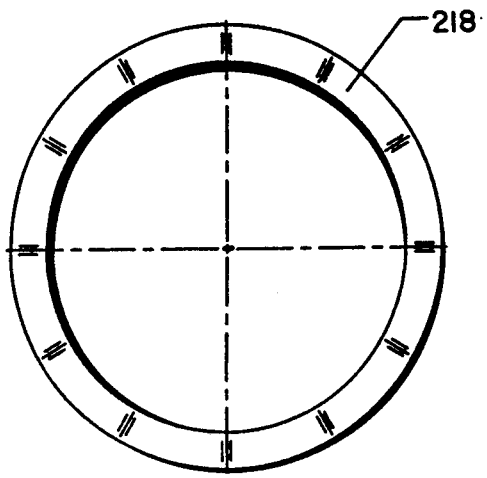
FIGS. 3 and 3A, 4 and 4A and 5 and 5A are top plan and front elevational views respectively of several forms of alternative spring means which may be employed with the ring assembly of the invention.
Figure 3A:
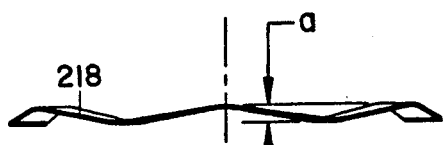

FIGS. 3 and 3A show a solid circle compression type wavey washer spring 218 having a compression distance a.

Figure 4:
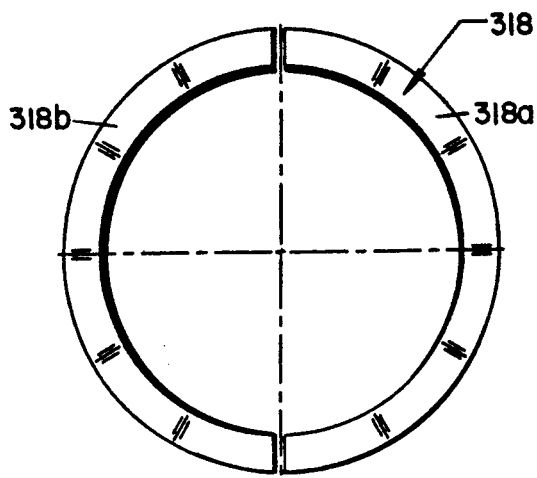
Figure 4A:
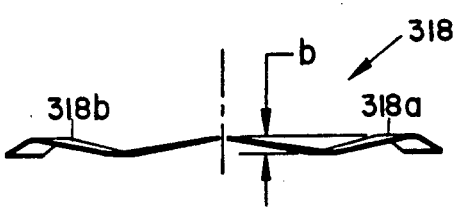

FIGS. 4 and 4A show a segmented compression type wavey washer spring 318 divided into half-circle segments 318a and 318b and having a compression distance b.

Figure 5:
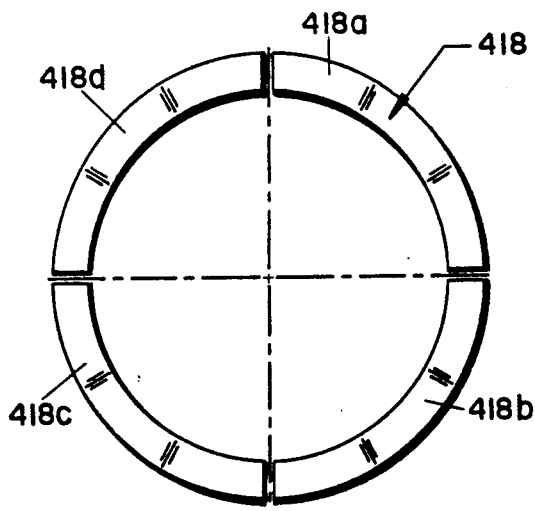
Figure 5A:
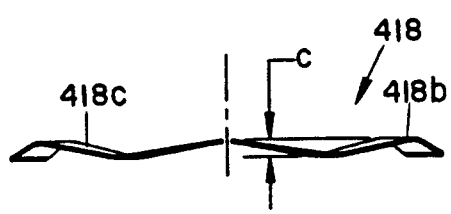

FIGS. 5 and 5A show a segmented compression type wavey washer spring 418 divided into quarter-circle segments 418a, 418b, 418c and 418d and having a compression distance c.

Figure 6:
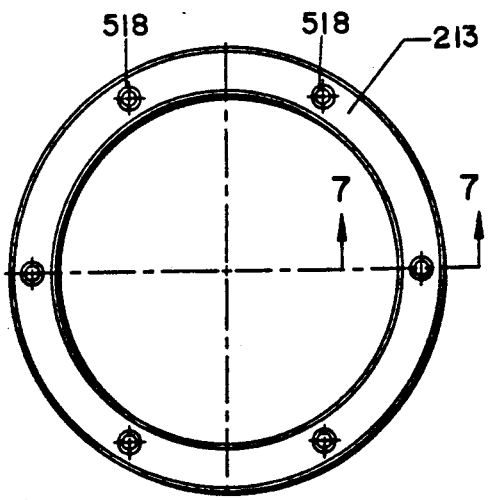
FIG. 6 is a top plan view of still another form of spring means.
Figure 7:
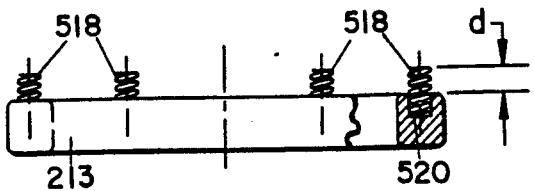
FIG. 7 is a cross-sectional view taken on line 7—7 of FIG. 6.

In FIGS. 6 and 7, a small piston ring 213 is modified to accept a plurality of circumferentially spaced compression type springs 518 which have their lower ends fixed in spaced openings 520 provided in the upper face of the piston ring and which have free upper ends disposed upwardly of the piston ring upper face to provide a compression distance d.

The above are just a few spring designs available for consideration by those skilled in the art.

The spring diameter, width, thickness and compression rate will be determined by the size, location and temperature of the piston ring assembly.

The springs 218, 318, 418 and 518 may be fabricated from Inconel-718 because of its exceptionally high yield tensile creep rupture properties at elevated temperature; however, there are other suitable materials available for consideration by those skilled in the art.

While it is apparent that the invention herein disclosed is well calculated to achieve the benefits and advantages as hereinabove set forth, it will be appreciated that the invention is susceptible to modification, variation and change without departing from the spirit thereof.

I claim:

1. In a turbine inclusive of:
    a turbine shaft having a longitudinal axis,
    a steam pipe,
    a shell circumadjacent the pipe,
    the pipe and shell being shiftable in vertical and transverse and axial directions relative to the longitudinal axis of the shaft,
    and a seal assembly disposed between the pipe and shell and comprising a stack of interdigitated relatively large and small piston rings,
    the improvement comprising:
    each large ring
        (a) loosely fitting inside the shell during nonoperative conditions and firmly and sealingly engaging the shell during operative conditions; and
        (b) having a coefficient of thermal expansion greater than that of the shell for expanding at a rate faster than the expansion rate of the shell under a condition of increased temperature,
    each small ring
        (a) loosely fitting around the pipe during nonoperative conditions and firmly and sealingly engaging the pipe during operative conditions; and
        (b) having a coefficent of thermal expansion less than that of the pipe for expanding at a rate slower than the expansion rate of the pipe under a condition of increased temperature,
    with the large and small rings tightening upon the respective shell and pipe respectively under a decreasing temperature condition due to the relative coefficients of thermal expansion between the large and small rings and the respective shell and pipe.

2. In a turbine as set forth in claim 1, wherein the small piston rings are fabricated from materials selected from any of the martensitic stainless steels for use at elevated temperatures.

3. In a turbine as set forth in claim 1, wherein the large piston rings are fabricated from materials selected from any of the austenitic stainless steels and precipitation hardening alloys intended for high temperature application.

4. In a turbine as set forth in claim 1, wherein the small piston rings are fabricated from low alloy steels intended for elevated temperature application with their contact surfaces overlay welded with cobalt-base alloys.

5. In a turbine as set forth in claim 1, wherein the large piston rings are fabricated from low alloy steels intended for elevated temperature application with their contact surfaces overlay welded with austenitic stainless steel.

6. In a turbine as set forth in claim 1, the further improvement of the addition of a surface lubricant to the pipe, shell and piston rings to minimize friction and oxide layer growth.

7. In a turbine as set forth in claim 6, wherein the surface lubricant to minimize friction and oxide layer growth comprises MOLYKOTE, a product of Dow Chemical Co., as a dry film.

8. In a turbine as set forth in claim 1, including spring means disposed between the piston rings and the shell for ensuring contact between piston rings at all times.

* * * * *

UNITED STATES PATENT AND TRADEMARK OFFICE
CERTIFICATE OF CORRECTION

PATENT NO. : 5,037,115
DATED : August 6, 1991
INVENTOR(S) : Ronald E. Brandon

It is certified that error appears in the above—identified patent and that said Letters Patent is hereby corrected as shown below:

In Claim 1, column 6 line 22 after "under" add

<u>an increasing temperature condition and</u>

<u>shrinking from the respective shell</u>

<u>and pipe respectively under</u>

Signed and Sealed this

Seventh Day of November, 1995

*Attest:*

BRUCE LEHMAN

*Attesting Officer*          *Commissioner of Patents and Trademarks*